(12) United States Patent
Mafune

(10) Patent No.: US 6,734,933 B2
(45) Date of Patent: May 11, 2004

(54) REFLECTION LIQUID CRYSTAL DISPLAY CAPABLE OF DISPLAYING PICTURES IN IMPROVED COLOR PURITY

(75) Inventor: Takahito Mafune, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/395,666

(22) Filed: Sep. 14, 1999

(65) Prior Publication Data

US 2001/0046012 A1 Nov. 29, 2001

(30) Foreign Application Priority Data

Sep. 14, 1998 (JP) .......................................... 10-260650

(51) Int. Cl.⁷ .......................................... G02F 1/1335
(52) U.S. Cl. ........................ 349/113; 349/99; 349/101; 349/102; 349/117
(58) Field of Search ........................ 349/117–119, 113, 349/96–103

(56) References Cited

U.S. PATENT DOCUMENTS 6,008,871 A * 12/1999 Okumura ..................... 349/61
6,067,136 A * 5/2000 Yamaguchi et al. ........... 349/96

FOREIGN PATENT DOCUMENTS

JP          10-239683         3/1998

* cited by examiner

*Primary Examiner*—Dung Nguyen
(74) *Attorney, Agent, or Firm*—Brinks Hofer Gilson & Lione

(57) ABSTRACT

A reflection liquid crystal display comprises a first transparent substrate, a second transparent substrate disposed opposite to the first transparent substrate, and a liquid crystal layer sandwiched between the first and the second transparent substrate. A transparent electrode layer and an alignment layer are formed in that order on the inner surface of the first transparent substrate, a reflecting polarizing film formed by laminating a transparent scattering layer and a light absorbing layer is placed on the outer surface of the first transparent substrate, a transparent electrode layer and an alignment layer are formed in that order on the inner surface of the second transparent substrate, and a phase plate and a polarizing plate are placed in that order on the outer surface of the second transparent substrate.

2 Claims, 2 Drawing Sheets

REFLECTION LIQUID CRYSTAL DISPLAY CAPABLE OF DISPLAYING PICTURES IN IMPROVED COLOR PURITY

BACKGROUND OF THE INVENTION

1. Field of the Invention

The present invention relates to a reflection liquid crystal display and, more particularly, to a reflection liquid crystal display capable of displaying pictures having improved color purity.

2. Description of the Related Art

There is a known color liquid crystal display of an electric field-controlled birefringence system (hereinafter referred to as "ECB system").

In an STN liquid crystal display, a liquid crystal layer has a birefringent effect to split a light beam. Therefore, when white light linearly polarized by a back polarizing plate travels through the liquid crystal layer, there occurs wavelength dispersion causing the combination of elliptically polarized light beams having major axes of different directions depending on wavelength. Therefore, different transmittance curves for light beams of different wavelengths, such as red, green and blue light beams, are obtained when voltage applied across the liquid crystal layer is varied gradually to change Δnd which is a product of Δn and d (Δn is the index anisotropy of the liquid crystal layer and d is the thickness of the liquid crystal layer).

When the product Δnd in a state where any voltage is not applied across the liquid crystal layer is not greater than a predetermined value and a birefringent layer having Δnd substantially equal to that of the liquid crystal layer is interposed between a liquid crystal cell and a front polarizing plate, the birefringent effect of the liquid crystal layer in a state where any voltage is not applied across the liquid crystal layer can substantially completely be cancelled out and light of characteristics nearly equal to those of the incident white light can be emitted. Therefore, pictures can be displayed in different colors, such as red, green and blue, by continuously varying the Δnd of the liquid crystal layer by controlling the voltage applied across the liquid crystal layer. Thus, color change can be achieved by voltage control.

The ECB system does not employ any color filter having disadvantages, such as high manufacturing cost and low transmittance. Therefore, the liquid crystal display of the ECB system displays pictures on a bright screen, does not consume much power and can be manufactured at a low manufacturing cost. The ECB system can be applied to both transmission liquid crystal displays and reflection liquid crystal displays.

Referring to FIG. 3, a reflection liquid crystal display 51 of the ECB system has a liquid crystal layer 52, an upper glass substrate 53 and a lower glass substrate 54. An upper transparent electrode layer 55 and an upper alignment layer 56 are formed in that order on the inner surface of the upper glass substrate 53. A lower transparent electrode layer 57 and a lower alignment layer 58 are formed in that order on the inner surface of the lower glass substrate 54.

The liquid crystal layer 52 is sandwiched between the upper alignment layer 56 and the lower alignment layer 58. A phase plate 59 capable of functioning as a birefringent layer, and an upper polarizing plate 60 are placed in that order on the outer surface of the upper glass substrate 53. A lower polarizing plate 61 and a reflecting plate 62 are placed in that order on the outer surface of the lower glass substrate 54. The reflecting plate 62 is formed by coating an irregular surface of a polyester film 65 with a metal reflecting film 63 of aluminum or silver by evaporation or the like. The metal reflecting film 63 has an irregular surface 64. The reflecting plate 62 is placed on the lower polarizing plate 61 with the irregular surface 64 of the metal reflecting film 63 in contact with the lower polarizing plate 61.

The reflection liquid crystal display displays pictures by using only sunlight or illuminating light and does not use any backlight. Although the reflection liquid crystal display has the advantage of operating at low power consumption, the lightness of pictures displayed by the reflection liquid crystal display is somewhat lower than that of pictures displayed by the transmission liquid crystal display provided with a backlight.

The liquid crystal display of the ECB system displays colors only by controlling the voltage applied across the liquid crystal layer without using any color filters. However, the liquid crystal display of the ECB system has difficulty in clearly displaying red and green in a satisfactory color purity.

SUMMARY OF THE INVENTION

Accordingly, it is an object of the present invention to provide a reflection liquid crystal display of the ECB system capable of displaying pictures in improved lightness and of displaying particularly red and green in improved color purity.

According to one aspect of the present invention, a reflection liquid crystal display comprises a first transparent substrate, a second transparent substrate disposed opposite to the first transparent substrate, and a liquid crystal layer sandwiched between the first and the second transparent substrate; wherein a transparent electrode layer and an alignment layer are formed in that order on the inner surface of the first transparent substrate, a reflecting polarizing film formed by laminating a transparent scattering layer and a light absorbing layer is placed on the outer surface of the first transparent substrate, a transparent electrode layer and an alignment layer are formed in that order on the inner surface of the second transparent substrate, and a phase plate and a polarizing plate are placed in that order on the outer surface of the second transparent substrate.

The reflection liquid crystal display in accordance with the present invention is provided with the reflection polarizing film instead of the polarizing plate and the reflecting plate to improve the color purity of red and green.

Preferably, the liquid crystal layer of the reflection liquid crystal display has a helical structure twisted through an angle in the range of 240° to 260°, a value $\Delta n_1 d_1$ which is a product of $\Delta n_1$ and $d_1$, where $\Delta n_1$ is the index anisotropy of the phase plate and $d_1$ is the thickness of the phase plate, is in the range of 1000 to 2000 nm, a value Δnd which is a product of Δn and d, where Δn is the index anisotropy of the liquid crystal and d is the thickness of the liquid crystal layer, is in the range of 800 to 1800 nm, the absorption axis of the polarizing plate is inclined to the delay axis of the phase plate at an angle in the range of −40° to −60° in a counterclockwise direction as viewed from the side of incident light, the delay axis of the phase plate is inclined to the alignment direction of the second alignment layer on the second transparent substrate at an angle in the range of −65° to −85° in a counterclockwise direction as viewed from the side of incident light, the absorption axis of the reflecting polarizing film is inclined to the alignment direction of the first alignment layer of the first transparent substrate at an angle in the range of +35° to +55° in a counterclockwise direction as viewed from the side of incident light.

Only a certain measure of improvement can be expected when the reflection liquid crystal display of the present invention is provided with only the reflecting polarizing film. Further effect can be expected when the polarizing plate, the phase plate and a rubbing axis are arranged in an optimum axis arrangement. The inventors of the present invention found through studies of axis arrangement that the foregoing axis arrangement further enhances the lightness color clearness of pictures displayed on the reflection liquid crystal display.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
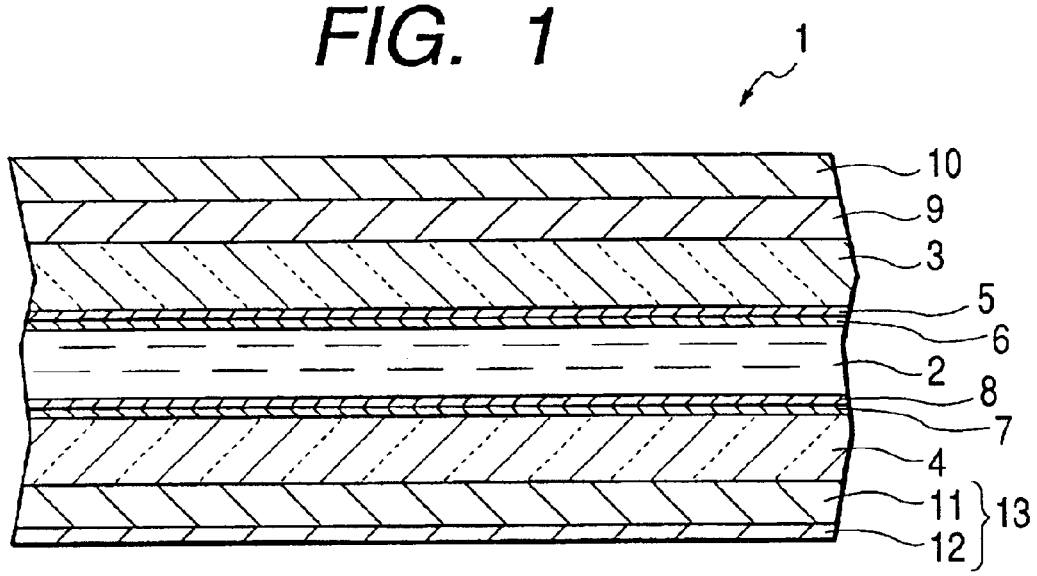
FIG. 1 is a fragmentary typical sectional view of a reflection liquid crystal display in a preferred embodiment according to the present invention.
Figure 3:
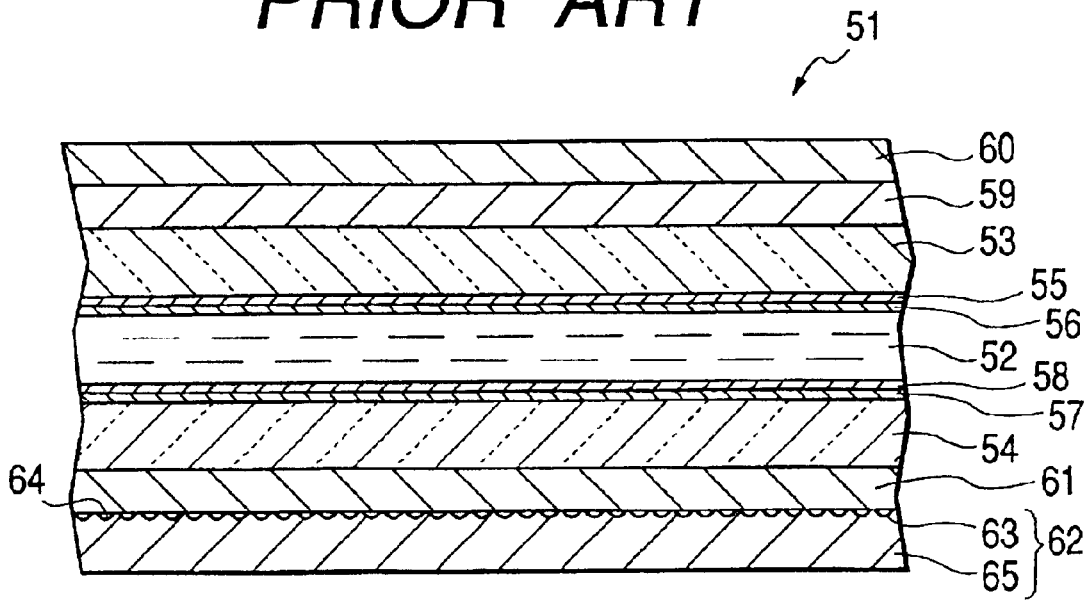
FIG. 3 is a fragmentary typical sectional view of a conventional reflection liquid crystal display of the ECB system.

Referring to FIG. 1, a reflection liquid crystal display 1 in a preferred embodiment according to the present invention has an upper glass substrate 3, a lower glass substrate 4 disposed opposite to the upper glass substrate 3, and a liquid crystal layer 2 sandwiched between the upper glass substrate 3 and the lower glass substrate 4. An upper transparent electrode layer 5 and an upper alignment layer 6 are formed in that order on the inner surface of the first transparent substrate 3. A lower transparent electrode layer 7 and a lower alignment layer 8 are formed in that order on the inner surface of the lower glass substrate 4. The liquid crystal layer 2 is sandwiched between the upper alignment layer 6 and the lower alignment layer 8. A phase plate 9 and an upper polarizing plate 10 are placed on the outer surface of the upper glass substrate 3. A reflecting polarizing film 13 formed by laminating a transparent scattering layer 11 and a light absorbing layer 12 is placed on the outer surface of the lower glass substrate 4.

One example of a commercially available reflecting polarizing film that may be used is RDF-B, a product available from Sumitomo 3M. The reflecting polarizing film RDF-B has a layer of a polyester resin as the transparent scattering layer 11, and a black layer of an acrylic resin as the light absorbing layer 12. The light absorbing layer 12 is coated with a protective film of a polyolefin resin. A diffusive adhesive layer of an acrylic adhesive and a separating PET film are laminated in that order on the transparent scattering layer 11.

When using the reflecting polarizing film RDF-B, the PET film is peeled off and the diffusive adhesive layer is applied to the lower glass substrate 4. The relative reflection luminance of the reflecting liquid crystal display of the present invention employing the reflecting polarizing film RDF-B is higher than that of a reflecting liquid crystal display employing a polarizing plate and a reflecting plate by about 20%. The reflecting liquid crystal display of the present invention is able to display pictures of high picture quality not giving rough appearance and parallax. The reflection liquid crystal display has a wide angle of view and can be formed in a thin structure.

The use of the reflecting polarizing film 13 instead of the polarizing plate and the reflecting plate improves the color purity of red and green images.

Figure 2:
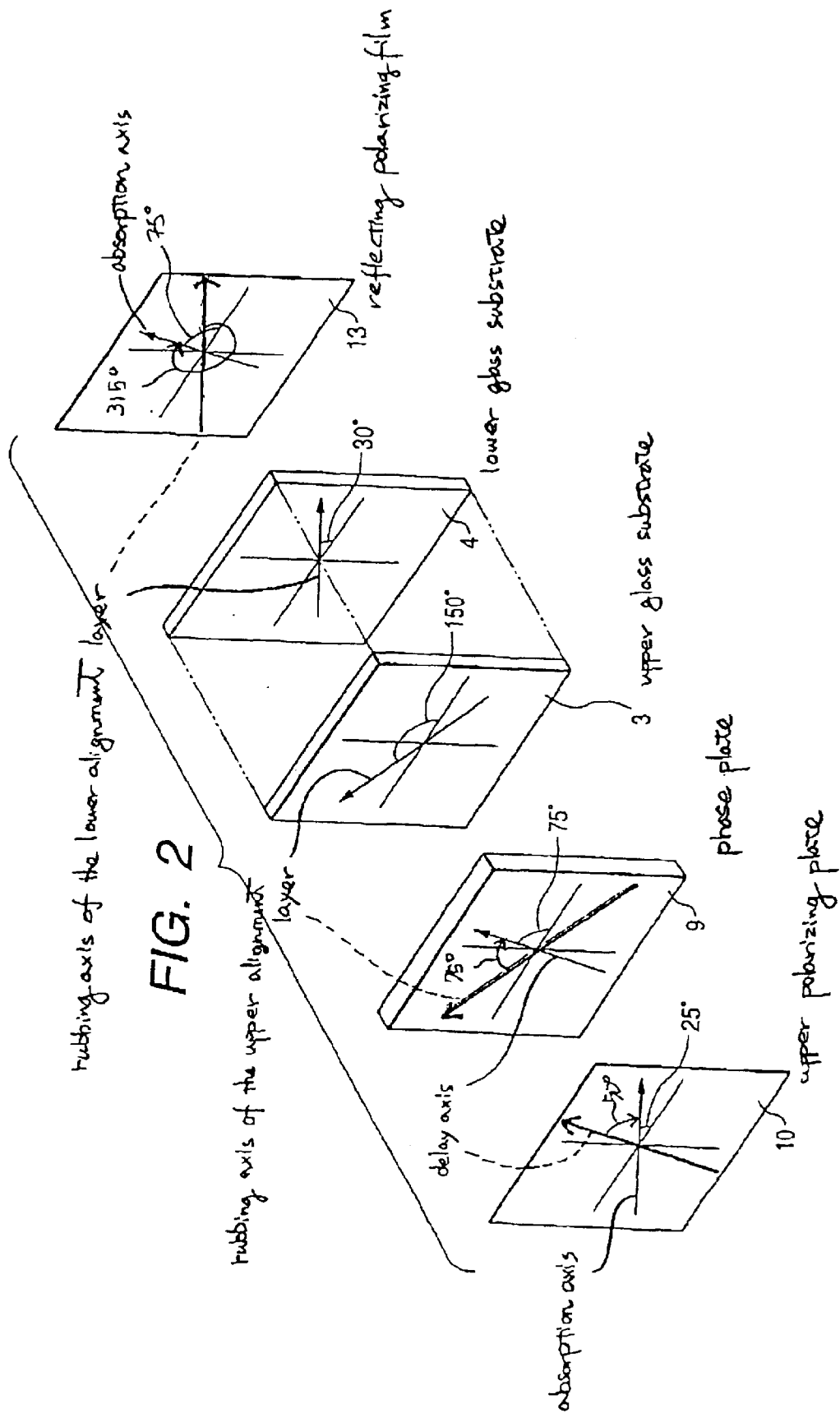
FIG. 2 is a typical view of assistance in explaining the arrangement of axes in the reflection liquid crystal display shown in FIG. 1.

An optimum conditions for axis arrangement for the reflection liquid crystal display of the present invention will be described hereinafter. FIG. 2 shows an axis arrangement in the reflection liquid crystal display shown in FIG. 1, in which the liquid crystal layer 2 has a helical structure twisted through 240° in the direction of the thickness thereof. The angle at which the rubbing axis of the upper alignment layer 6 formed on the upper glass substrate 3 extend to the rubbing axis of the lower alignment layer 8 formed on the lower glass substrate 4 is 240° in a counterclockwise direction as viewed from the side of incident light. The product $\Delta nd$ of the index anisotropy $\Delta n$ of the liquid crystal and the thickness d of the liquid crystal layer 2 is in the range of 800 to 1800 nm.

The product $\Delta n_1 d_1$ of the index anisotropy $\Delta n_1$ of the phase plate 9 and the thickness $d_1$ of the phase plate 9 is in the range of 1000 to 2000 nm. The delay axis of the phase plate 9 is inclined at −75° in a counterclockwise direction as viewed from the side of incident light to the rubbing axis of the upper alignment layer 6. The absorption axis of the polarizing plate 10 is inclined at −50° in a counterclockwise direction as viewed from the side of incident light to the delay axis. The absorption axis of the reflecting polarizing film 13 is inclined at +45° in a counterclockwise direction as viewed from the side of incident light to the rubbing axis of the lower alignment layer 8 formed on the lower glass substrate 4. Since the components of the reflection liquid crystal display are disposed in the foregoing axis arrangement, lightness of pictures is enhanced and colors are displayed clearly.

The values of the product $\Delta nd$ and the product $\Delta n_1 d_1$, the axis arrangement of the polarizing plate, the phase plate and the alignment layers may be other than those mentioned above and may be changed within the scope of the present invention.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A reflection liquid crystal display comprising:

a first transparent substrate;

a second transparent substrate disposed opposite to the first transparent substrate;

a liquid crystal layer sandwiched between the first and the second transparent substrates;

a first transparent electrode layer formed on an inner surface of the first transparent substrate;

a first alignment layer formed on the first transparent electrode layer;

a reflecting polarizing film including a laminated combination of a transparent scattering layer composed of a polyester resin and a black layer of an acrylic resin as a light absorbing layer, the reflecting polarizing film being disposed on an outer surface of the first transparent substrate such that the black layer is an outermost layer of the reflecting polarizing film;

a second transparent electrode layer formed on an inner surface of the second transparent substrate;

a second alignment layer formed on the second transparent electrode layer;

a phase plate placed on an outer surface of the second transparent substrate; and a polarizing plate disposed on the phase plate, wherein the liquid crystal layer has a helical structure twisted through an angle in the range of 240° to 260° in a direction of a thickness of the liquid crystal layer, a value $\Delta n_1 d_1$ which is a product of $\Delta n_1$ and $d_1$, where $\Delta n_1$ is an index anisotropy of the phase plate and $d_1$ is a thickness of the phase plate, is in the range of 1000 to 2000 nm, a value $\Delta nd$ which is a product of $\Delta n$ and $d$, where $\Delta n$ is an index anisotropy of the liquid crystal and d is a thickness of the liquid crystal layer, is in the range of 800 to 1800 nm, an absorption axis of the polarizing plate differs from a delay axis of the phase plate by an angle in a range of −40° to −60° in a counterclockwise direction as viewed from an incident light side, the delay axis of the phase plate differs from an alignment direction of the second alignment layer on the second transparent substrate by an angle in a range of −65° to −85° in the counterclockwise direction as viewed in from the incident light side, and an absorption axis of the reflecting polarizing film in the transparent scattering layer is inclined at an angle of about 75° in the counterclockwise direction with respect to the 3 o'clock position and differs from an alignment direction of the alignment layer of the first transparent substrate at by angle in a range of −305° to −325° in a counterclockwise direction as viewed from the incident light side.

2. A reflection liquid crystal display according to claim 1, wherein the helical structure of the liquid crystal layer is twisted through an angle of substantially 240° in the direction of the thickness of the liquid crystal layer, the absorption axis of the polarizing plate differs from the delay axis of the phase plate by substantially −50° in a counterclockwise direction as viewed from the incident light side, the delay axis of the phase plate differs from the alignment direction of the second alignment layer by substantially −75° in the counterclockwise direction as viewed in from the incident light side, and the absorption axis of the reflecting polarizing film differs from the alignment direction of the alignment layer of the first transparent substrate at by substantially −315° in a clockwise direction as viewed from the incident light side.

* * * * *